United States Patent
Takami et al.

(10) Patent No.: US 6,536,661 B1
(45) Date of Patent: *Mar. 25, 2003

(54) ELECTRONIC MONEY TRANSACTION SYSTEM WITH A RADIO TRANSMITTER AND RECEIVER USING A PORTABLE TELEPHONE

(75) Inventors: Yutaka Takami, Yokohama (JP); Kenji Matsumoto, Yokohama (JP); Shigeyuki Itoh, Zushi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,852

(22) Filed: Dec. 14, 1999

Related U.S. Application Data

(63) Continuation of application No. 08/925,621, filed on Sep. 9, 1997, now Pat. No. 6,016,956.

(30) Foreign Application Priority Data

Sep. 18, 1996 (JP) .............................................. 8-246498

(51) Int. Cl.[7] .............................................. G06F 17/60
(52) U.S. Cl. ...................... 235/379; 235/378; 235/384
(58) Field of Search ................................. 235/379, 378, 235/377, 382, 384, 385, 449, 493; 902/4, 10; 705/39, 41, 42

(56) References Cited

U.S. PATENT DOCUMENTS

| | | | |
|---|---|---|---|
| 4,965,821 A | | 10/1990 | Bishop, II et al. |
| 5,220,838 A | | 6/1993 | Gutman et al. |
| 5,426,667 A | * | 6/1995 | Van Zon ..................... 375/219 |
| 5,440,634 A | | 8/1995 | Jones et al. |
| 5,459,304 A | * | 10/1995 | Eisenmann ................. 235/380 |
| 5,485,520 A | | 1/1996 | Chaum et al. |
| 5,495,098 A | | 2/1996 | Pailles et al. |
| 5,511,121 A | | 4/1996 | Yacobi |
| 5,691,525 A | * | 11/1997 | Aoki et al. .................. 235/379 |
| 5,698,837 A | | 12/1997 | Furuta |
| 5,714,741 A | * | 2/1998 | Pieterse ...................... 235/380 |
| 5,734,722 A | | 3/1998 | Halpern |
| 5,739,510 A | | 4/1998 | Petit |
| 5,751,973 A | * | 5/1998 | Hassett ....................... 395/213 |
| 5,806,045 A | | 9/1998 | Biorge et al. |
| 5,857,152 A | | 1/1999 | Everett |
| 5,962,833 A | * | 10/1999 | Hayashi ...................... 235/384 |
| 6,032,858 A | * | 3/2000 | Yazumi et al. .............. 235/379 |

FOREIGN PATENT DOCUMENTS

| | | |
|---|---|---|
| JP | 392966 | 4/1991 |
| WO | 9320539 A | 10/1993 |
| WO | 9611453 A | 4/1996 |
| WO | 9625828 A | 8/1996 |

OTHER PUBLICATIONS

Shaw, "Cash On Delivery–Mobile Consumer Management Goes Back To Basics," *IEE Colloquium On Mobile Communications Towards The Year 2000*, GB IEE, pp. 6/1–6/6, 1994, London.

* cited by examiner

*Primary Examiner*—Michael G. Lee
*Assistant Examiner*—Daniel St. Cyr
(74) *Attorney, Agent, or Firm*—Antonelli, Terry, Stout & Kraus, LLP

(57) ABSTRACT

A terminal 2 held by the user is provided with a radio transmitter and receiver 3. Electronic money information is transferred via the radio transmitter and receiver 3. By using a portable telephone, it is unnecessary to directly insert an IC card 1 into service supply equipment 17. In addition to the service supply equipment 17, a device 9 for storing electronic money information in a lump is provided. Since the electronic money information is transferred into the device 9 for storing the electronic money information in a lump, it is unnecessary to collect the electronic money information stored in terminals one by one.

22 Claims, 14 Drawing Sheets

ELECTRONIC MONEY TRANSACTION SYSTEM WITH A RADIO TRANSMITTER AND RECEIVER USING A PORTABLE TELEPHONE

This is a continuation of parent application Ser. No. 08/925,621, filed Sep. 09, 1997, allowed now U.S. Pat. No. 6,016,956.

BACKGROUND OF THE INVENTION

The present invention relates to an electronic money transaction system for performing transactions by electrically transmitting and receiving electronic money information stored in an IC card in place of money, and more particularly, to an electronic money transaction system for transmitting and receiving the electronic money information by electromagnetic waves through space.

Hitherto, in a transaction system using electronic money for electrically transmitting and receiving electronic money information, for example, as disclosed in Japanese Patent Application Laid-Open No. 3-92966, an individual as a payer (user) carrying an IC card (electronic wallet) in which electronic money information is stored visits a shop and transmits and receives the electronic money information by using a POS (Point Of Sales) terminal or the like installed at the shop. That is, when an individual wants to receive any service, the individual has to always insert the IC card into the POS terminal or the like to transfer the electronic money information.

As disclosed in the foregoing JP-A-3-92966 for example, the electronic money information is once stored in a terminal installed at a shop, and later, transmitted to an apparatus in a bank center via a communication channel. Consequently, it is necessary to connect communication channels to all of terminals installed at shops.

SUMMARY OF THE INVENTION

As mentioned above, in the conventional technique, it is necessary to insert the IC card into an insertion port of the terminal such as a POS terminal in order to transfer the electronic money information. It is, therefore, always necessary for the user to directly touch the terminal. For example, even the user inside a car wants to receive service, the insertion of the IC card into the terminal is still required.

It is, therefore, an object of the invention to enable transactions of the electronic money information to be performed at a place away from the terminal.

In the conventional technique, it is necessary to provide a communication channel to every terminal in order to send the electronic money information once stored in the terminal to be collected later on, at an apparatus in a bank center or the like.

It is, therefore, another object of the invention to collect the electronic money information without providing the communication channel to every terminal.

Means of Solving the Problems

According to a fundamental feature of the invention, in order to achieve the objects, there is provided an electronic money terminal to be carried by the payer, which is constructed as a portable telephone terminal comprising, an electronic money information medium interface having functions of reading and writing information from/to an electronic money information medium, and a radio transmitter and receiver for radio telephone, wherein each time service is given by using service supply equipment, the service supply equipment and the payer to receive the service are discriminated and specified, and the electronic money information is transferred via the radio transmitter and receiver of the payer. As mentioned above, according to the invention, the electronic money information is transmitted and received between the payer's terminal and the service provider via the radio transmitter and receiver. It is the point of the present invention how to accurately specify a one-to-one correspondence of the electronic money medium of the payer and service supply equipment.

As a radio transmitter and receiver for the radio telephone, that of a type limited to a relatively small area such as a PHS (Personal Handy-Phone System) is advantageous. By providing such radio telephone equipment near the service supply equipment, when the payer operates the portable telephone terminal to make an electronic money transaction, a display of the service supply equipment can be used as a part of an interactive means of a man-machine interface.

Upon transaction of the electronic money, not only the electronic money information but also particular number information of each portable telephone terminal is transmitted from the portable telephone terminal, thereby reducing burden on the payer in an interactive process with the man-machine interface.

Preferably, the electronic money information medium is an IC card.

According to the fundamental feature of the invention, the payer can pay a proper consideration without directly inserting the IC card into the service supply equipment and can receive corresponding service, and the electronic money transaction by radio can be realized.

According to another feature of the invention, in addition to the fundamental feature, there is provided a device for storing electronic money information in a lump in addition to the service supply equipment.

Consequently, the electronic money information can be directly transferred from the IC card to the storing device. It is therefore unnecessary to collect the electronic money information stored in terminals one by one. Further, by generating a signal specifying that the payer is the party to receive the service, the electronic money information from a plurality of terminals can be classified and stored, so that only one device for storing the electronic money information in a lump is necessary for the plurality of terminals. Consequently, there is no need to provide a communication channel to every terminal.

According to still another feature of the invention, there is provided a function of transmitting and receiving the electronic money information via space to/from the IC card of the payer.

According to the feature, it is also unnecessary to directly insert the IC card to the service supply equipment. Further, the IC card built in the terminal can generate the electronic money information only to a specific IC card, thereby enabling the electronic money information to be collected by transferring it between the terminals when the user carries the specific IC card. It is therefore unnecessary to provide a communication channel for collecting the electronic money information.

Features of the invention will be further described hereinbelow.

According to the invention, there is provided an electronic money transaction system comprising: an IC card storing electronic money information; a terminal for reading and writing the information of the IC card; a communicating means for transmitting and receiving electronic information from the terminal to/from the other; an electronic money storing means which can store at least electronic money in the electronic information transmitted and received via the communicating means; and service supply equipment operated by a signal sent from the electronic money storing means, wherein the communicating means connected to the terminal is used as a portable telephone terminal for transmitting and receiving electronic information to/from the outside by using electromagnetic waves and transactions of the electronic money are performed via the electromagnetic waves from the portable telephone terminal.

According to the invention, there is provided the electronic money transaction system wherein the electronic money storing means and the service supply equipment are separately provided, at least a signal instructing service supply is sent from the electronic money storing means to the service supply equipment and the service is supplied in accordance with the signal.

According to the invention, there is provided the electronic money transaction system wherein an operator of the terminal performs an operation at least once to show desire of receiving the service from the service supply equipment before completion of the transaction of the electronic money.

According to the invention, there is provided the electronic money transaction system wherein a display is provided and a display by which the operator performs the operation to show the desire of receiving the service is executed.

According to the invention, there is provided the electronic money transaction system wherein the display is provided at a position so that the operator to receive the service of the service supply equipment can easily discriminate the contents.

According to the invention, there is provided the electronic money transaction system wherein the terminal has an input means of a character string, a number, or a code, the character string, number, or code is displayed on the display, and the operator inputs the displayed character string, number, or code from the input means, thereby performing the operation to show the desire of receiving the service.

According to the invention, there is provided the electronic money transaction system wherein after the operator performs the operation to show the desire of receiving the service, the electronic money storing means receives electronic information indicative of the operation via the communicating means, and the electronic money storing means generates a confirmation signal indicative of receipt of the electronic information indicative of the operation.

According to the invention, there is provided the electronic money transaction system further comprising a confirmation signal display means for displaying the confirmation signal showing the receipt of the electronic information indicative of the operation.

According to the invention, there is provided the electronic money transaction system wherein the confirmation signal display means is provided at a position so that the operator to receive the service by the service supply equipment can easily discriminate the contents.

According to the invention, there is provided an electronic money transaction system comprising: a first IC card storing electronic money information; a transmitter and receiver that is connected to the first IC card and transmits and receives the electronic money information via space; a second transmitter and receiver for transmitting and receiving the electronic money information via the transmitter and receiver; a terminal for controlling transfer of the electronic money information via the second transmitter and receiver; a connecting unit for passing the electronic money information from the terminal; and a second IC card which can record the electronic money information passed through the connecting unit, wherein the first IC card has a memory for storing electronic information indicative of the IC card, the electronic information in the memory can be transferred to the terminal via the transmitter and receiver and the second transmitter and receiver, the terminal has a passing means for transmitting the electronic information of the first IC card which passed the transmitter and receiver to the second IC card via the second transmitter and receiver and electronic information which is recorded in the second IC card to specify another IC card is compared with the electronic information sent from the first IC card, and when the electronic information sent from the first IC card and the electronic information recorded in the second IC card satisfies a certain condition, the electronic money information is transferred from the second IC card to the first IC card.

According to the invention, there is provided the electronic money transaction system wherein the electronic money information can be transferred from the first IC card to the second IC card irrespective of the result of the comparison of the electronic information sent from the first IC card with the electronic information recorded in the second IC card.

According to the invention, there is provided the electronic money transaction system wherein the electronic information sent from the first IC card is compared with the electronic information recorded in the second IC card by an information processing unit in an IC card for controlling the second IC card.

According to the invention, there is provided the electronic money transaction system wherein the portable telephone terminal has particular information, the particular information is sent from the portable telephone terminal, and the service supply equipment manages supply of service on the basis of the transmitted particular information.

According to the invention, there is provided the electronic money transaction system wherein the portable telephone terminal has particular information, the particular information is sent from the portable telephone terminal, the service supply equipment is provided with means for generating time information, there is provided time storing means for storing the particular information sent and the time information as an output from the time information generating means, and the service supply equipment records the information into the time storing means, thereby managing the service supply.

According to the invention, there is provided an electronic money transaction system comprising: a first IC card in which electronic money information is stored; a transmitter and receiver that is connected to the first IC card and transmits and receives the electronic money information via space; a second transmitter and receiver for transmitting and receiving the electronic money information via the transmitter and receiver; a terminal for controlling transfer of the electronic money information sent via the second transmitter and receiver; a connecting unit for passing the electronic money information from the terminal; and a second IC card which can record the electronic money information passed through the connecting unit, wherein the first IC card has a memory of electronic information indicative of the IC card, the electronic information in the memory can be transferred to the terminal via the transmitter and receiver and the second transmitter and receiver, the electronic information in the memory is a code which cannot be easily formed ordinarily, the terminal has a decoding and passing means for decoding the encoded electronic information of the first IC card passed through the transmitter and receiver and transmitting the decoded electronic information of the first IC card to the second IC card via the second transmitter and receiver, electronic information which is recorded in the second IC card to specify another IC card is compared with the electronic information sent from the first IC card, and when the electronic information sent from the first IC card and the electronic information recorded in the second IC card satisfies a certain condition, the electronic money information is transferred from the second IC card to the first IC card.

As mentioned above, according to the invention, the terminal carried by the user is provided with the radio transmitter and receiver to transfer the electronic money information via the radio transmitter and receiver, so that it is unnecessary to directly insert the IC card into the service supply equipment. By providing not only the service supply equipment but also the device for storing the electronic money information in a lump, the electronic money information is directly transferred to the storing device. It is therefore unnecessary to collect the electronic money information stored in the terminals one by one.

Further, by generating the signal specifying that the user is the party to receive the service, the electronic money information from a plurality of terminals can be classified and stored, so that only one device for storing the electronic money information in a lump is necessary for the plurality of terminals. Therefore, it is unnecessary to provide the communication channel every terminal.

According to the invention, there is provided the function of transmitting and receiving the electronic money information via space to/from the IC card of the user. Consequently, it is unnecessary to directly insert the IC card to the service supply equipment. Further, by enabling the IC card built in the terminal to generate the electronic money information only to a specific IC card, when the specific IC card is carried, the electronic money information can be transferred between the terminals to collect money. It is, therefore, unnecessary to provide a communication channel for collecting the electronic money information.

DETAILED DESCRIPTION OF THE PREFERRED EMBODIMENTS

A first embodiment of the invention will be described with reference to FIGS. 1 to 6.

Figure 1:
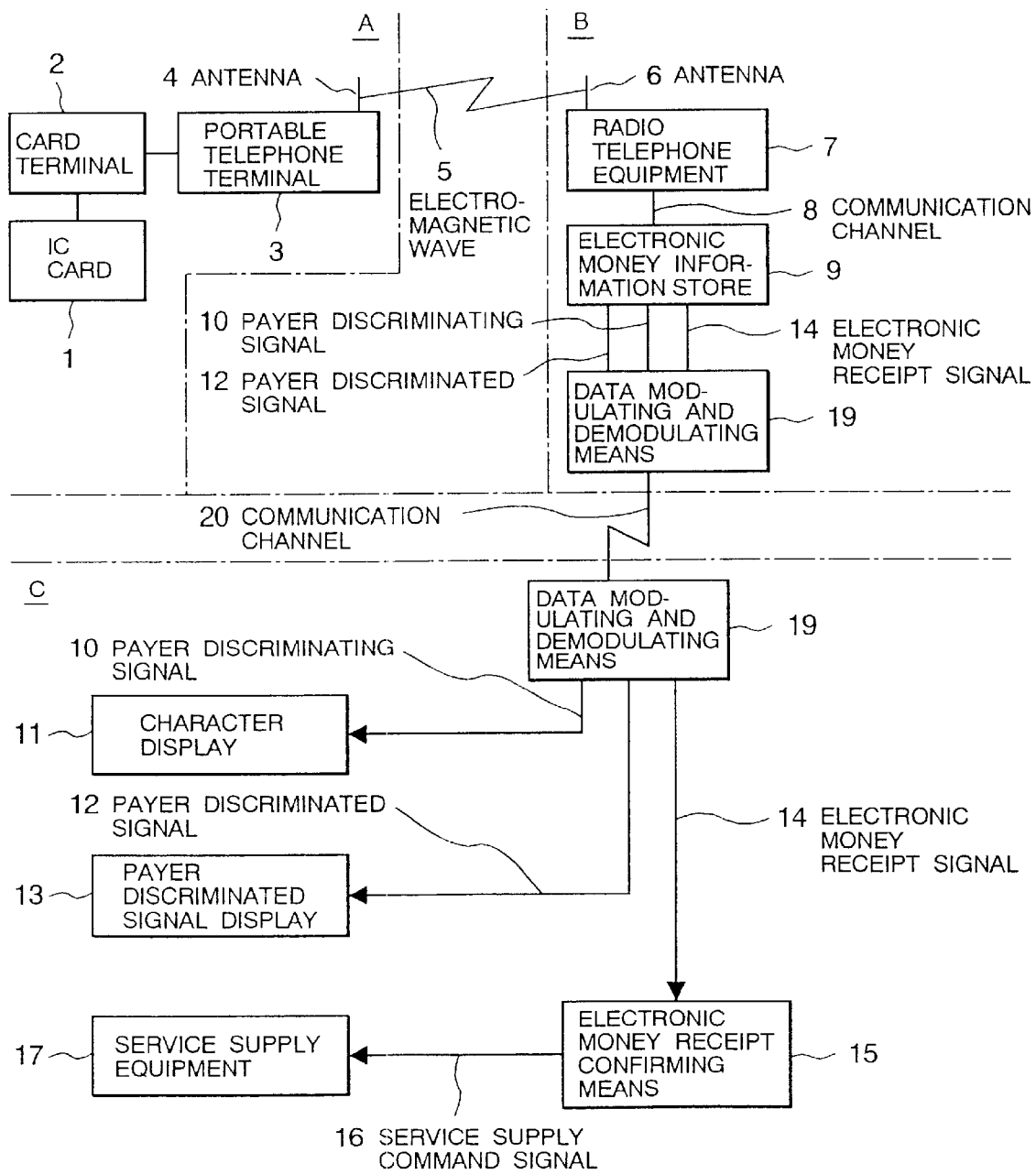
FIG. 1 is a system construction diagram showing a construction of a first embodiment.

FIG. 1 is a system construction diagram of the first embodiment of the electronic money transaction system according to the invention. Broadly speaking, the system has a payer terminal device part A, an electronic money storing means part B, and a service supplying equipment part C.

In the payer terminal device part A, reference numeral 1 denotes an IC card having therein electronic money information; 2 a terminal having functions of controlling the IC card 1 and transferring the electronic money information; 3 a portable telephone terminal that is connected to the terminal 2 and receives and transmits the electronic money information as a radio signal; and 4 an antenna attached to the portable telephone terminal 3. The payer terminal device part A is connected to the electronic money storing means part B by electromagnetic waves 5 transmitted and received via the antenna 4.

In the electronic money storing means part B and the service supplying equipment part C, reference numeral 6 denotes an another antenna for receiving and transmitting the electromagnetic waves 5 from/to the antenna 4; 7 radio telephone equipment connected to the antenna 6; 8 a communication channel through which signals are transmitted and received to/from the radio telephone equipment 7; 9 an electronic money information store for controlling and processing the signals received through the communication channel 8 and storing the electronic money information; 10 a payer discriminating signal as signal information to specify the payer for the payer of the electronic money; 11 a character display for displaying the transmitted payer discriminating information, so that the payer can recognize it; 12 a payer discriminated signal for showing the specified payer of the electronic money; 13 a payer discriminated signal display for displaying the transmitted payer discriminated signal, so that the payer can recognize it; 14 an electronic money receipt signal indicating that the electronic money information store 9 received the electronic money; 15 an electronic money receipt confirming means for receiving the electronic money receipt signal; 16 a service supply command signal for instructing supply of the service, that is generated from the electronic money receipt confirming means 15; and 17 service supply equipment for supplying service to the payer of the electronic money upon receipt of the service supply command signal 16.

In the above construction, the payer discriminating signal 10, payer discriminated signal 12, and electronic money receipt signal 14 are sent between the electronic money storing means part B and the service supply equipment part C via a data modulating and demodulating means 19 by using a communication channel 20. The payer side is also provided with a data modulating and demodulating means 21 (refer to FIG. 6) to reproduce the transmitted payer discriminating signal 10, payer discriminated signal 13, and electronic money receipt signal 14.

Figure 2:
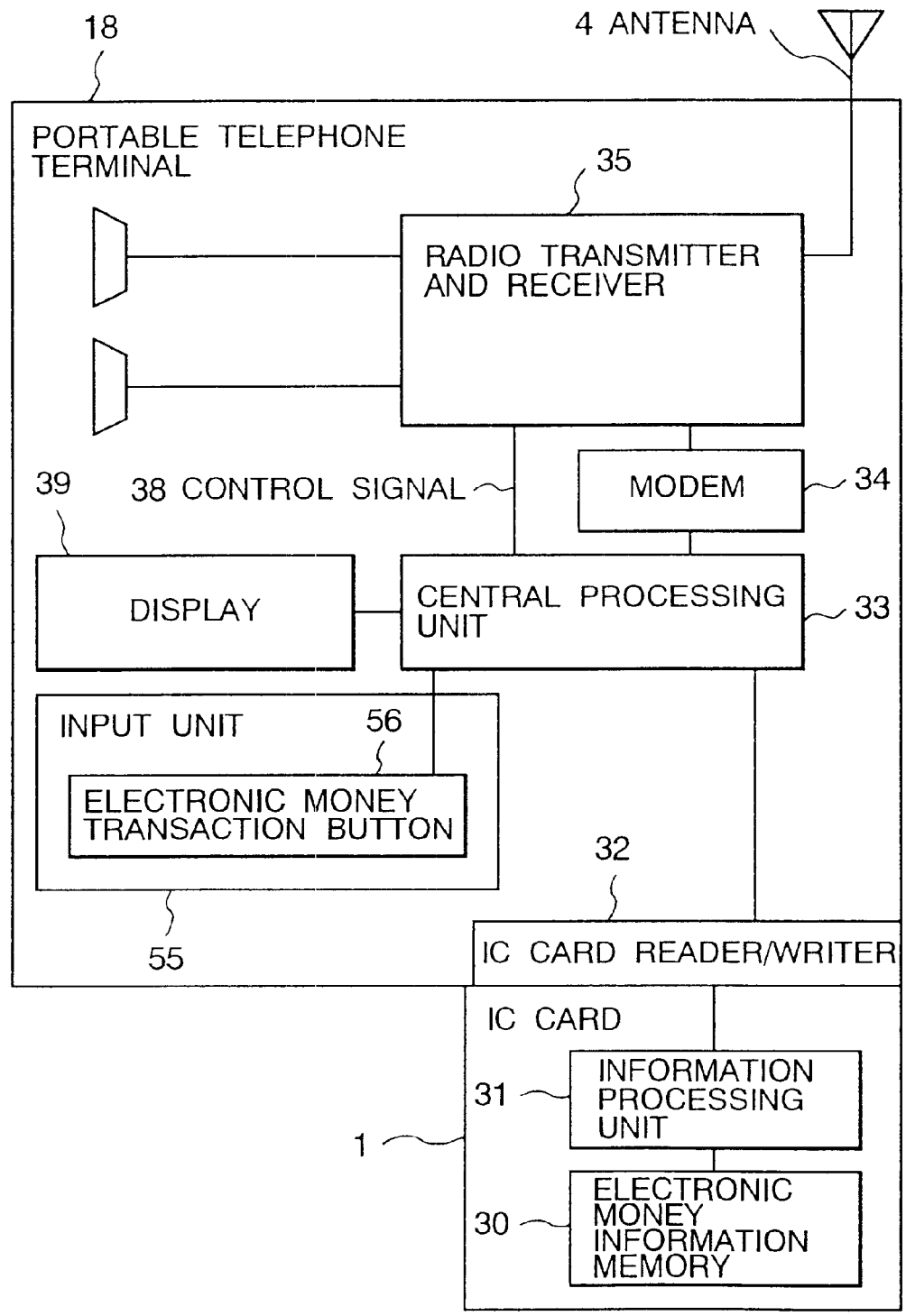
FIG. 2 is a block diagram of a payer terminal device part in the first embodiment.

FIG. 2 is a construction diagram showing an embodiment of the payer terminal device part A, comprising the IC card 1, terminal 2, portable telephone terminal 3, and antenna 4 in FIG. 1. In FIG. 2, the terminal 2 and portable telephone terminal 3 are integrated as a portable telephone terminal 18. The IC card 1 includes an electronic money information memory 30 in which electronic money information is stored and an information processing unit 31 for controlling update of the electronic money information of the electronic money information memory 30, output of the balance, and the like. The portable telephone terminal 18 has an IC card reader/writer 32 for receiving and transmitting the electronic information from/to the IC card 1. The electronic information read/written from/to the IC card reader/writer 32 is inputted and outputted to/from a central processing unit (CPU) 33.

The CPU 33 supplies and receives the electronic information to/from a radio transmitter and receiver 35 via a modem 34, and controls the radio transmitter and receiver 35 by using a control signal 38. The antenna 4 is connected to the radio transmitter and receiver 35 so as to transmit and receive electronic information to/from another radio telephone equipment 7 via space. Further, a display 39 is connected to the CPU 33, which can display information for the payer. Information can be inputted by an input unit 55. The input unit 55 has an electronic money transaction button 56. When the button 56 is depressed, the CPU 33 transmits or receives the electronic money information.

Figure 3:
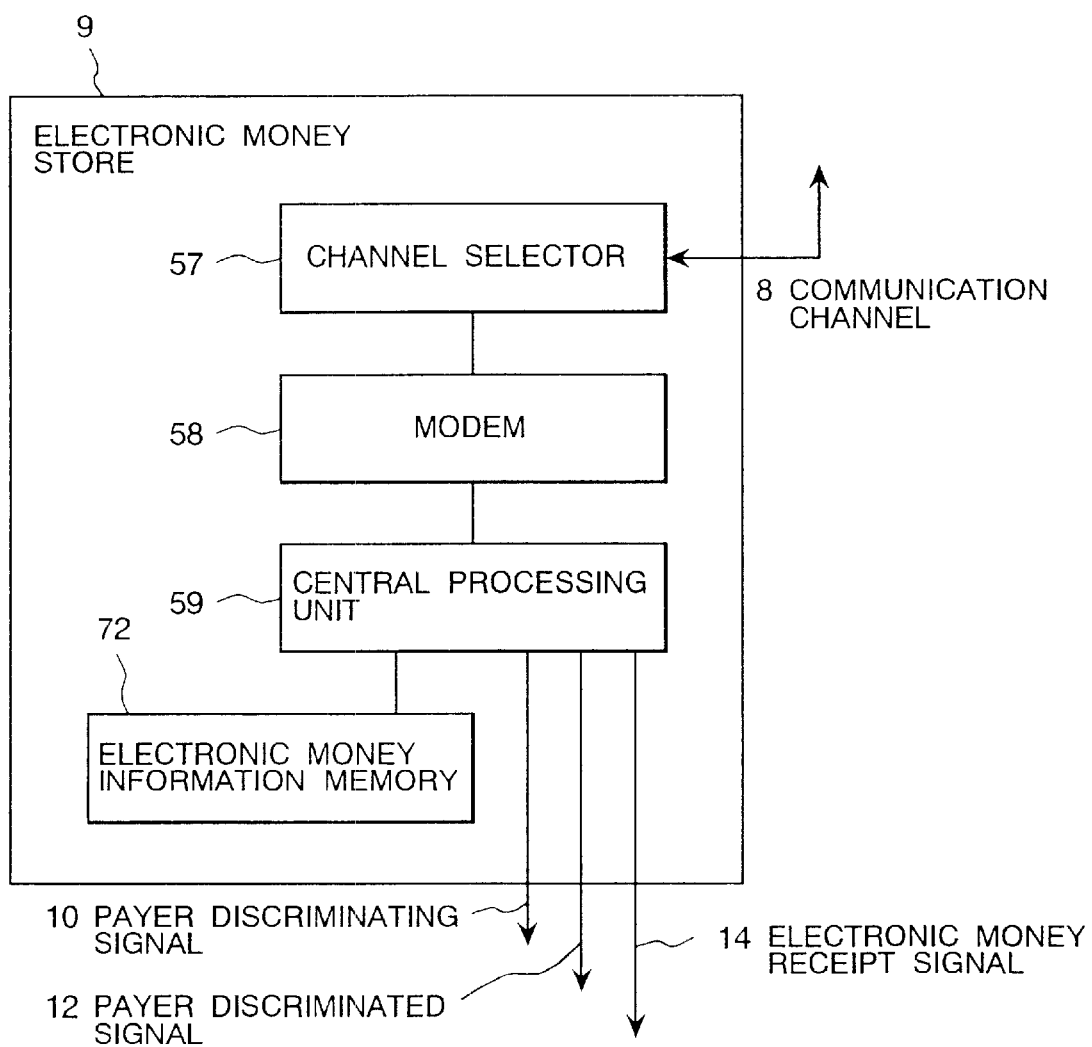
FIG. 3 is a block diagram of an electronic money information store in the first embodiment.

FIG. 3 is a construction diagram showing an embodiment of the electronic money information store 9 in FIG. 1. The communication channel 8 is connected to a channel selector 57. The channel selector 57 transmits and receives the electronic information via the communication channel 8. An output of the channel selector 57 is connected to a modem 58. The modem 58 demodulates a modulated signal to digital data and modulates the digital data to a signal so as to be transmitted or received via the communication channel 8. Reference numeral 59 denotes a central processing unit (CPU) for controlling the electronic money information store 9 and controlling communication of the electronic money information. Reference numeral 72 indicates an electronic money information memory for storing the electronic money information inputted and outputted via the CPU 59.

The operation of the first embodiment with the above construction will be described with reference to FIGS. 4 to 6.

Figure 4:
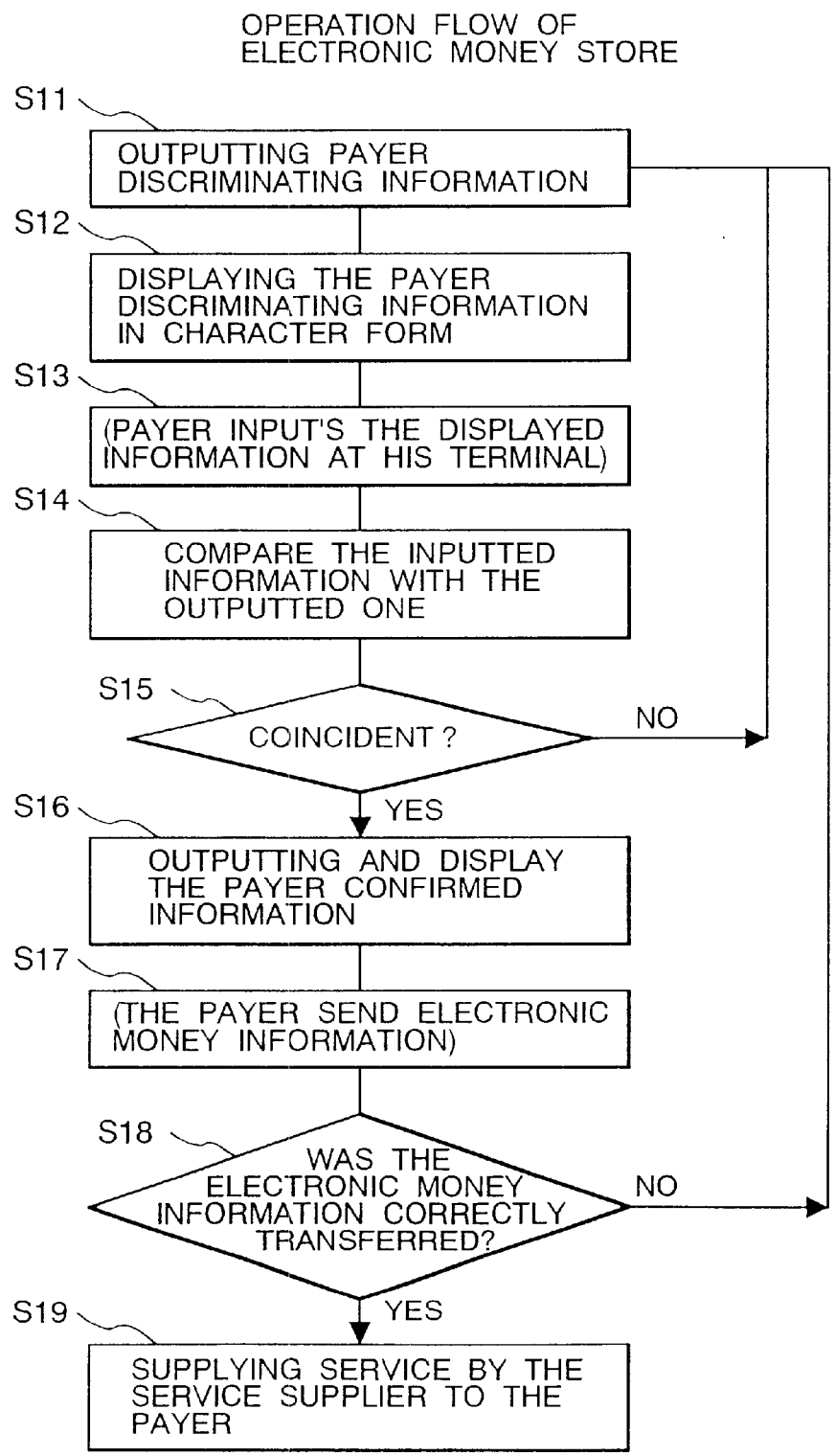
FIG. 4 is a flowchart showing the operation of the first embodiment.
Figure 5:
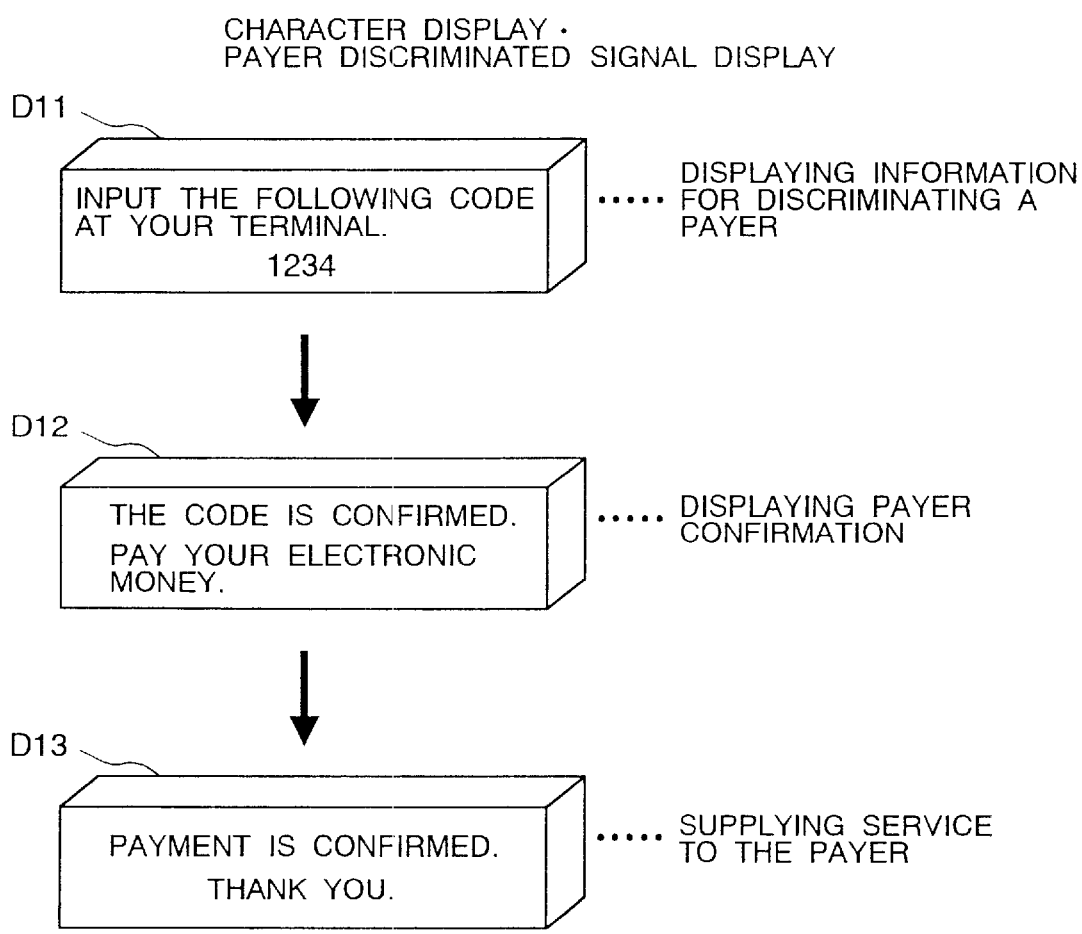
FIG. 5 is a diagram illustrating a display example of a character display in the first embodiment.

FIG. 4 is a flowchart showing the operation of processes in the electronic money information store 9. Processes after the payer operates the portable telephone terminal 3 and notifies the electronic money information store 9 of payment of the electronic money via the radio telephone equipment 7 are shown. First the electronic money information store 9 outputs the payer discriminating signal 10 (S11) and allows the outputted payer discriminating information to be displayed on the character display 11 (S12). The payer then inputs the information displayed in character form at the input unit 55 of the portable telephone terminal 3 (S13). The information in character form is transmitted to the electronic money information store 9 via the radio telephone equipment 7. The electronic money information store 9 compares the inputted information with the outputted payer discriminating information (S14). When they are coincided, the electronic money transaction with the payer is specified. The result is outputted as the payer discriminated signal 12 (S15) and the signal 12 is displayed on the payer discriminated signal display 13 (S16). The payer of the electronic money recognizes the payer discriminated signal display 13 and sends electronic money information stored in the IC card 1 via the portable telephone terminal 3 by operating the terminal (S17). The electronic money information is sent via the communication channel 8 and stored into the electronic money information store 9. After detecting that the electronic money information was correctly stored (S18), the electronic money information store 9 outputs the electronic money receipt signal 14. After receipt of the electronic money receipt signal 14, the electronic money receipt confirming means 15 instructs an operation to provide service to the payer by the service supply command signal 16. The service supply equipment 17 provides service to the payer according to the service supply command signal 16 (S19).

The operation of the first embodiment will be described in further detail with reference to FIGS. 5 and 6. FIG. 5 shows an example of display of the character display 11, payer discriminated signal display 13, and service supply equipment 17. When the payer operates the portable telephone terminal 3 to notify the electronic money information store 9 of payment of the electronic money via the radio telephone equipment 7, the payer discriminating signal 10 is displayed (D11). At this time, instruction of the operation for the payer is also displayed. Subsequently, the payer discriminated signal 12 is displayed (D12). After completion of transfer of the electronic money information, service supply is displayed according to the electronic money receipt conforming signal (D13).

Figure 6:
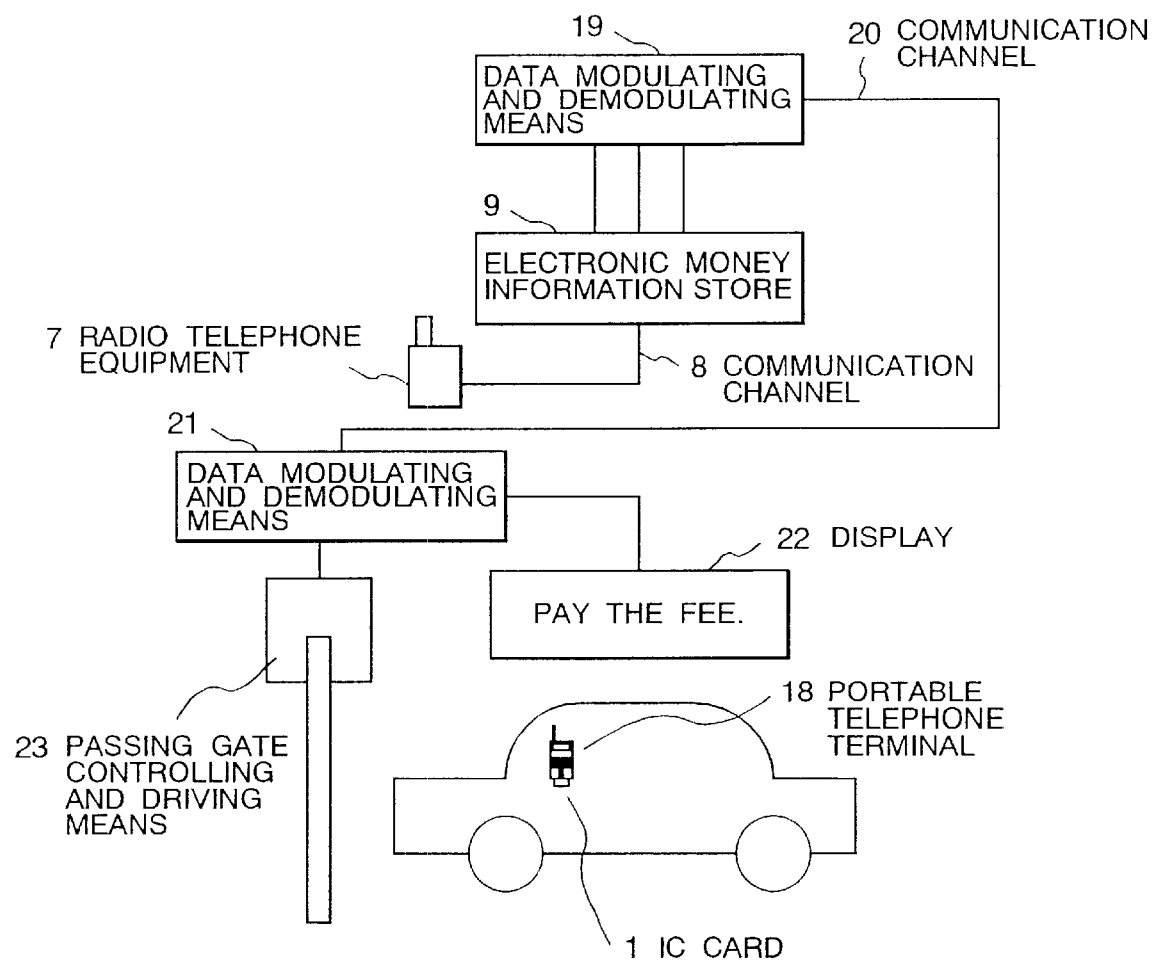
FIG. 6 is a construction diagram showing a parking lot tollgate system to which the first embodiment is applied.

FIG. 6 is a construction diagram showing a case where the first embodiment is applied to a tollgate system of a parking lot.

In FIG. 6, one display 22 is used and the payer discriminating signal 10, payer discriminated signal 12, and electronic money receipt signal 14 are displayed on the display 22. A passing gate controlling and driving means 23 is provided as service supply equipment. By opening the gate, the supply of the service to the payer is completed. The payer can operate according to the display of, for example, the payer discriminating signal 10 shown in FIG. 5 displayed on the display 22.

The effects of the above-mentioned first embodiment are as follows.

According to the embodiment, the payer who pays the electronic money information to receive the service can perform transactions of the electronic money while being apart from the service supply equipment. By using the payer discriminating information, the transfer of the electronic money can be recorded every service given to the payer. Consequently, the transactions of the electronic money information for a plurality of services can be processed by a single electronic money information store. Further, since the electronic money information is not stored in each service supplying device but is stored in a lump, it is unnecessary to collect money from each of the service supplying devices.

A second embodiment of the invention will be described with reference to FIG. 7.

Figure 7:
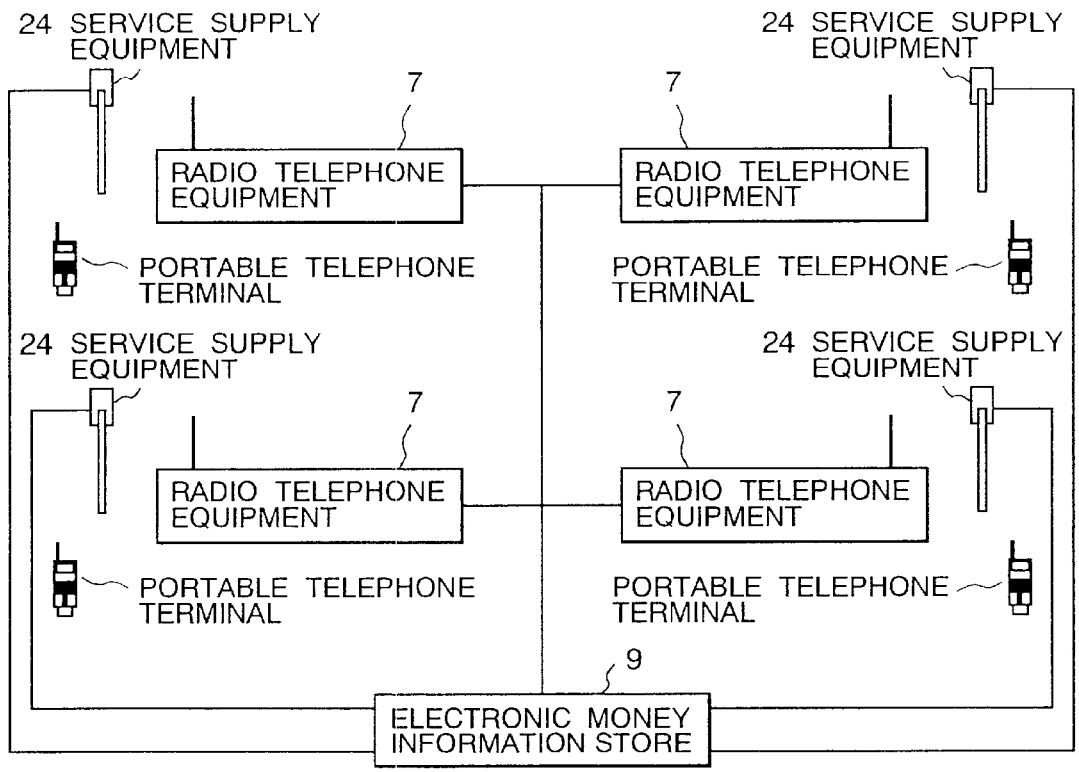
FIG. 7 is a construction diagram showing a parking lot tollgate system according to a second embodiment.

FIG. 7 is a construction diagram showing the second embodiment of the invention. The construction will be described hereinbelow with reference to FIG. 7. The same components in the second embodiment as those in the first embodiment are designated by the same reference numerals. In the second embodiment, a plurality of service supply equipments 24 are disposed and are controlled by a single electronic money information store 9. In this case, a plurality of the radio telephone equipments 7 are also installed and transmitting and receiving ranges are not overlapped. Each service supply equipment 24 lies within the transmitting and receiving range of each radio telephone equipment 7. Each portable telephone terminal 18 used by the payer receives a signal that specifies one of the plurality of radio telephone equipments 7 and sends the signal specifying the radio telephone equipment 7 together with electronic money information to the electronic money information store 9. The signal is shown in FIG. 8.

Figure 8:
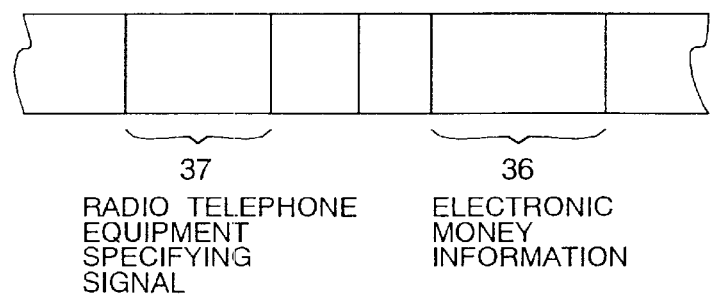
FIG. 8 is a diagram showing a format of a radio telephone equipment specifying signal in the second embodiment.

FIG. 8 shows the signal sent from the portable telephone terminal 18. In FIG. 8, reference numeral 36 denotes electronic money information and 37 indicates an information signal specifying the radio telephone equipment sent from the radio telephone equipment. By receiving the signal 37 specifying the radio telephone equipment 7 together with the electronic money information, the electronic money information store 9 can recognize that the portable telephone terminal 18 of the payer transmits and receives electromagnetic waves to/from the radio telephone equipment 7.

The operation of the second embodiment with the above construction will be described. In the embodiment, by sending the information by which the radio telephone equipment 7 can be discriminated together with the electronic money information, the electronic money information store 9 can recognize that the information came through which radio telephone equipment 7. Since the service supply equipment 24 is allocated to the radio telephone equipment 7 in a one-to-one manner, the electronic money information store 9 can specify that the electronic money information is sent to which service supply equipment 24. Therefore, the service supply equipment is specified without the operation by the payer of inputting the information specifying the payer as described in the first embodiment.

According to the second embodiment, each payer transfers the electronic money information directly to a single electronic money information store in a manner similar to the first embodiment. However, since it is unnecessary for the payer to input the signal for specifying the payer, the operation is easier than that of the first embodiment.

A third embodiment of the invention will be described with reference to FIG. 9.

Figure 9:
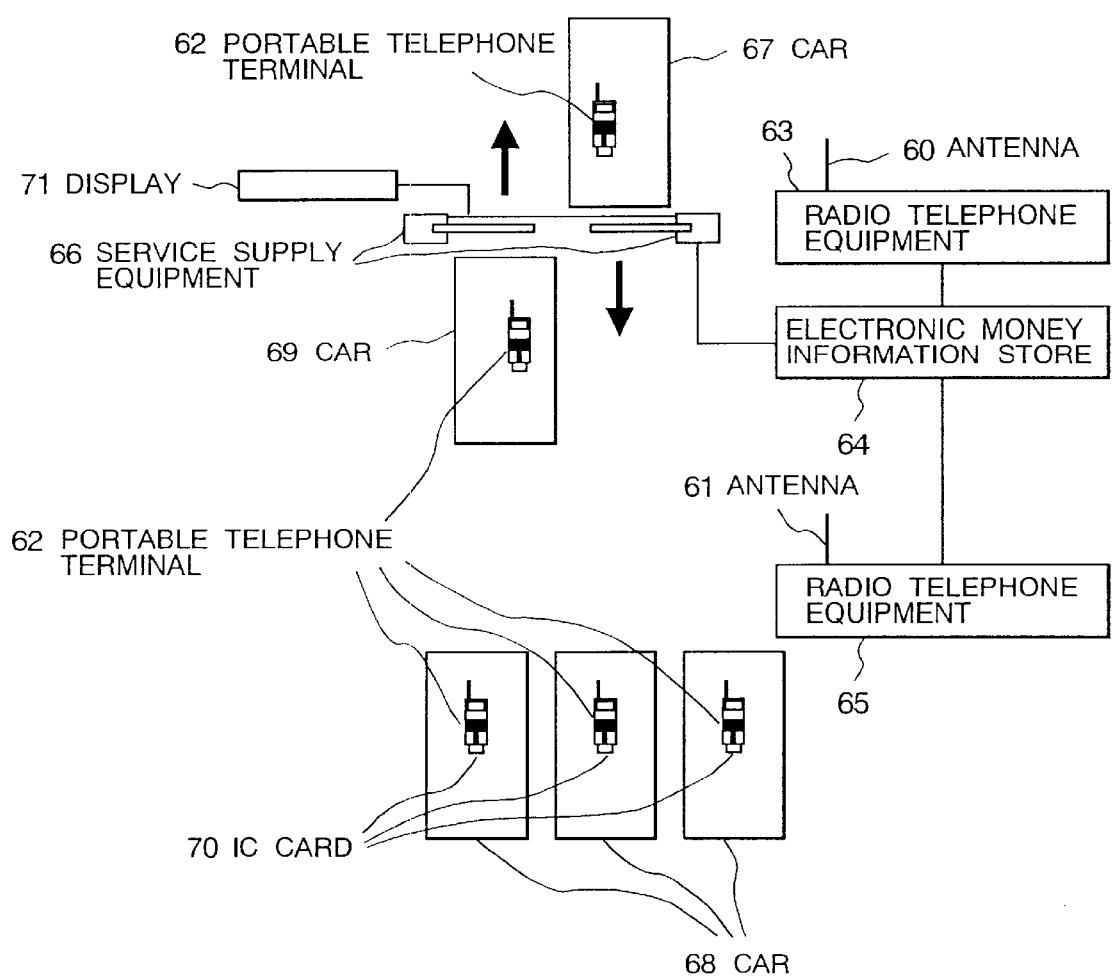
FIG. 9 is a construction diagram showing a parking lot tollgate system to which a third embodiment is applied.

FIG. 9 is a construction diagram showing the third embodiment of the invention. The construction will be described hereinbelow with reference to FIG. 9. The third embodiment relates to an example of applying the invention to a parking lot. Reference numeral 60 denotes an antenna provided at the entrance of the parking lot; 61 another antenna; 70 IC cards each storing electronic money information; 62 portable telephone terminals of the embodiment, to which the IC cards 70 are connected, respectively; 63 radio telephone equipment for transmitting and receiving electromagnetic waves to/from the portable telephone terminals 62 via the antenna 60 arranged at the entrance of the parking lot; 64 an electronic money information store for transmitting and receiving electronic information to/from the radio telephone equipment 63; and 65 radio telephone equipment for transmitting and receiving electromagnetic waves to/from the portable telephone terminals 62 via the antenna 61. The electronic money can be stored in the electronic money information store 64. Reference numeral 66 denotes service supply equipment which is a gate of the parking lot in the embodiment; 67 a car to receive the service; 68 cars which are in the parking lot of the embodiment; and 69 a car going out from the parking lot of the embodiment.

The construction of the third embodiment will be described more specifically with reference to FIGS. 10 and 11.

Figure 10:
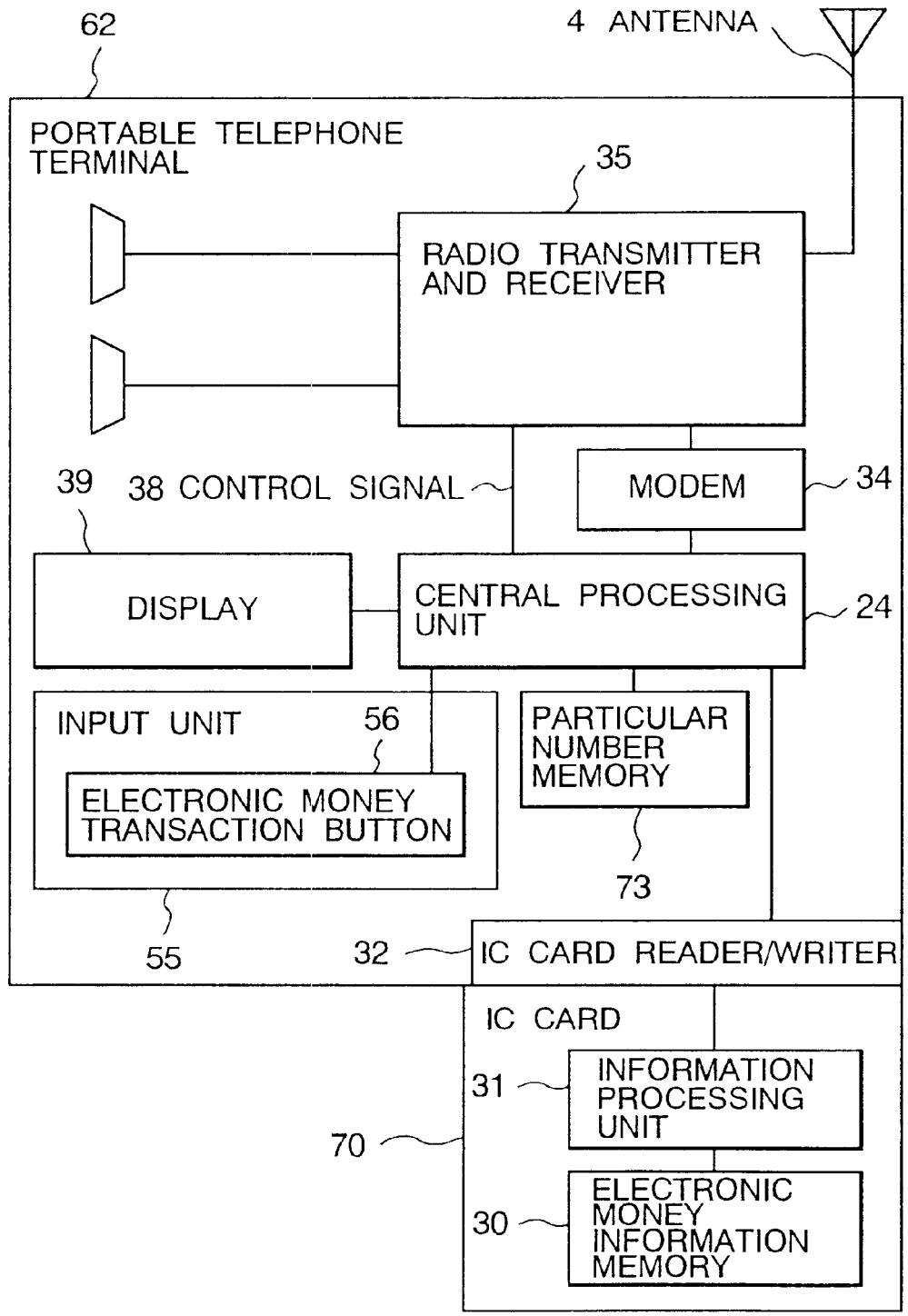
FIG. 10 is a diagram showing a construction of the payer terminal part in the third embodiment.

FIG. 10 is a diagram showing the construction of the IC card 70 and the portable telephone terminal 62 shown in FIG. 9. Components similar to those in the first embodiment are designated by the same reference numerals. In addition to the construction of the first embodiment, a memory 73 for storing a number particular to the radio telephone terminal 62 is provided in the third embodiment. A central processing unit 74 has a function of transmitting the information of the particular number memory 73 to the outside according to necessity via the modem 34, radio transmitter and receiver 35, and antenna 4. For example, a telephone number is recorded as a particular number.

Figure 11:
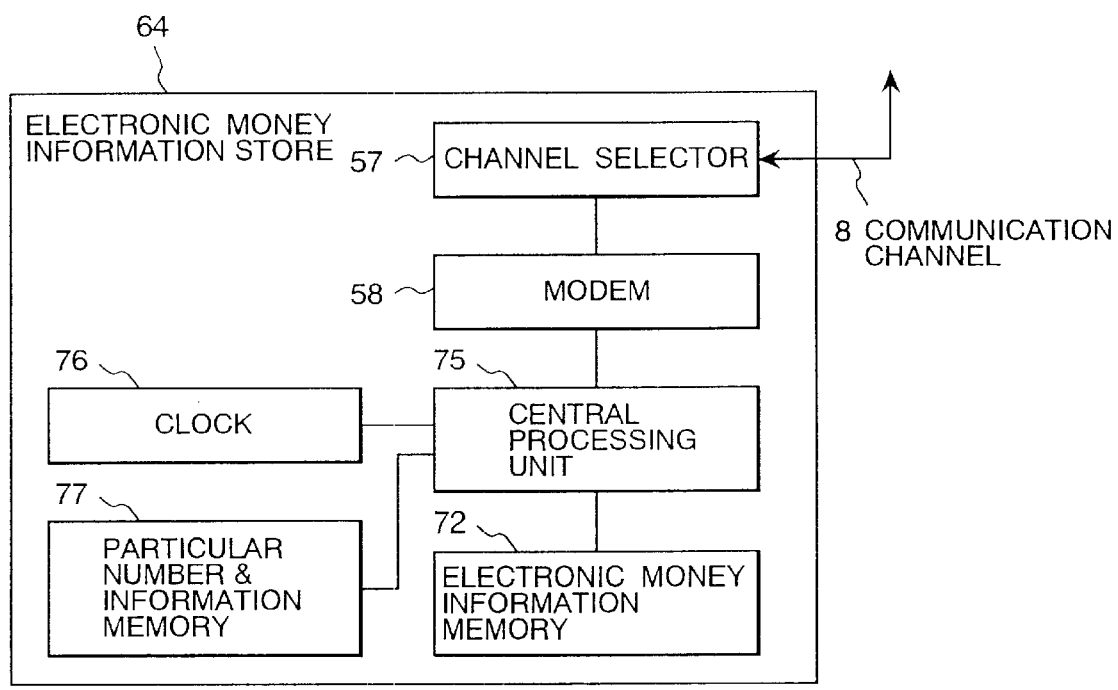
FIG. 11 is a diagram showing a construction of the electronic money information store in the third embodiment.

FIG. 11 is a diagram showing a construction of the electronic money information store 64 of the third embodiment. Components similar to those in the first embodiment are designated by the same reference numerals. In the third embodiment, a clock 76 for generating time information is provided. A particular number and information memory 77 is also provided.

The operation of the third embodiment with the constructions shown in FIGS. 9 to 11 will be described. In the embodiment, the payer of the car 67 to receive the service has the portable telephone terminal 62 and approaches the service supply equipment 66. The antenna 60 is provided in a range near the service supply equipment 66 and the portable telephone terminal 62 automatically sends a signal indicating that the portable telephone terminal 62 enters the range to the radio telephone equipment 63. The signal includes the particular number stored in the particular number memory 73 in the portable telephone terminal 62. The radio telephone equipment 63 which received the signal recognizes that the portable telephone terminal 62 having the particular number exists at the entrance of the parking lot. After that, the radio telephone equipment 63 notifies the electronic money information store 64 of the particular number. The electronic money information store 64 generates a signal to operate the service supply equipment 66 so that the car 67 can enter the parking lot. After that, in the electronic money information store 64, the time when the car 67 entered the parking lot is read from the clock 76 and is recorded together with the particular number into the particular number and information memory 77.

Figure 12:
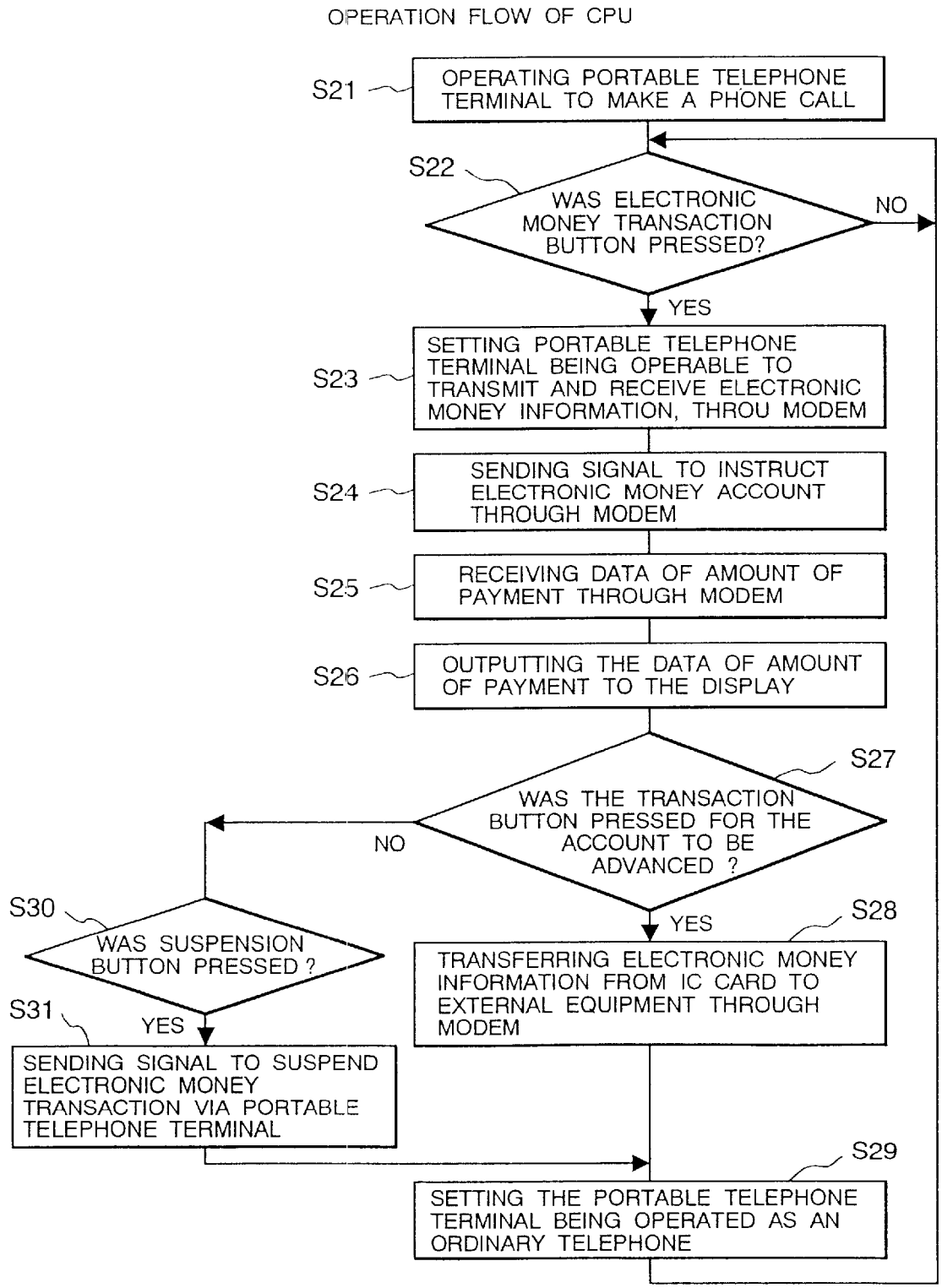
FIG. 12 is a flowchart showing the operation of the third embodiment.

The operation when the car goes out from the parking lot will be described. A processing flow at this time of the CPU 74 in the portable telephone terminal 62 is shown in FIG. 12. The payer in the car 68 to go out from the parking lot makes a phone call to the electronic money information store 64 by using the portable telephone terminal 62 (S21). The electronic money information store 64 first receives the particular number of the portable telephone terminal 62 which made the phone call. After that, the time when the car entered the parking lot recorded every particular number is read, the present time is detected, and a fee of the parking lot is calculated. The calculated fee is transmitted to the portable telephone terminal 62 which made the phone call, via the radio telephone equipment 65 and the antenna 61. The fee transmitted is displayed on the portable telephone terminal 62 (S26). After receiving confirmation of the payer (S27), the electronic money information is sent from the connected IC card (S28). In the electronic money information store 64, after confirming the transmitted electronic money information, the particular number, information indicative of completion of the payment, and time when the payment is completed are recorded into the internal memory.

The payer in the car 69 who completed the payment moves to the exit of the service supply equipment 66. When the portable telephone terminal 62 of the payer in the car 69 who completed the payment enters the transmission and reception range of the antenna 60, the portable telephone terminal 62 entered the transmission and reception range of the antenna 60 automatically sends the particular number. The radio telephone equipment 63 transmits the sent particular number to the electronic money information store 64. The electronic money information store 64 compares the received particular number with the recorded particular number under which the payment was completed. When it is found from the comparison that the payment has been already made, the present time is acquired. The obtained present time is compared with the recorded time when the payment was completed. When the difference is equal to time required for the movement in the parking lot, a signal to operate the service supply equipment 66 is generated so that the car 69 can go out. As a result of the comparison of the time, when further payment is necessary, it is displayed on a display 71.

According to the third embodiment as mentioned above, the particular number, for example, telephone number of the portable telephone terminal is used and automatically discriminated for discrimination of the service supply. It is, therefore, unnecessary for the payer who is to receive service to operate equipment such as ticket issuing equipment for registering entering time. According to the embodiment, the operation for payment can be also performed at a place away from the service supply equipment, so that there is an effect that it is unnecessary to perform the operation at a place near the service supply equipment. Although the particular number is recorded in the portable telephone terminal in the embodiment, it will be obviously understood that a particular number is recorded in the IC card and the service supply can be discriminated by using the particular number recorded in the IC card without problem.

A fourth embodiment of the invention will be described with reference to FIG. 13.

Figure 13:
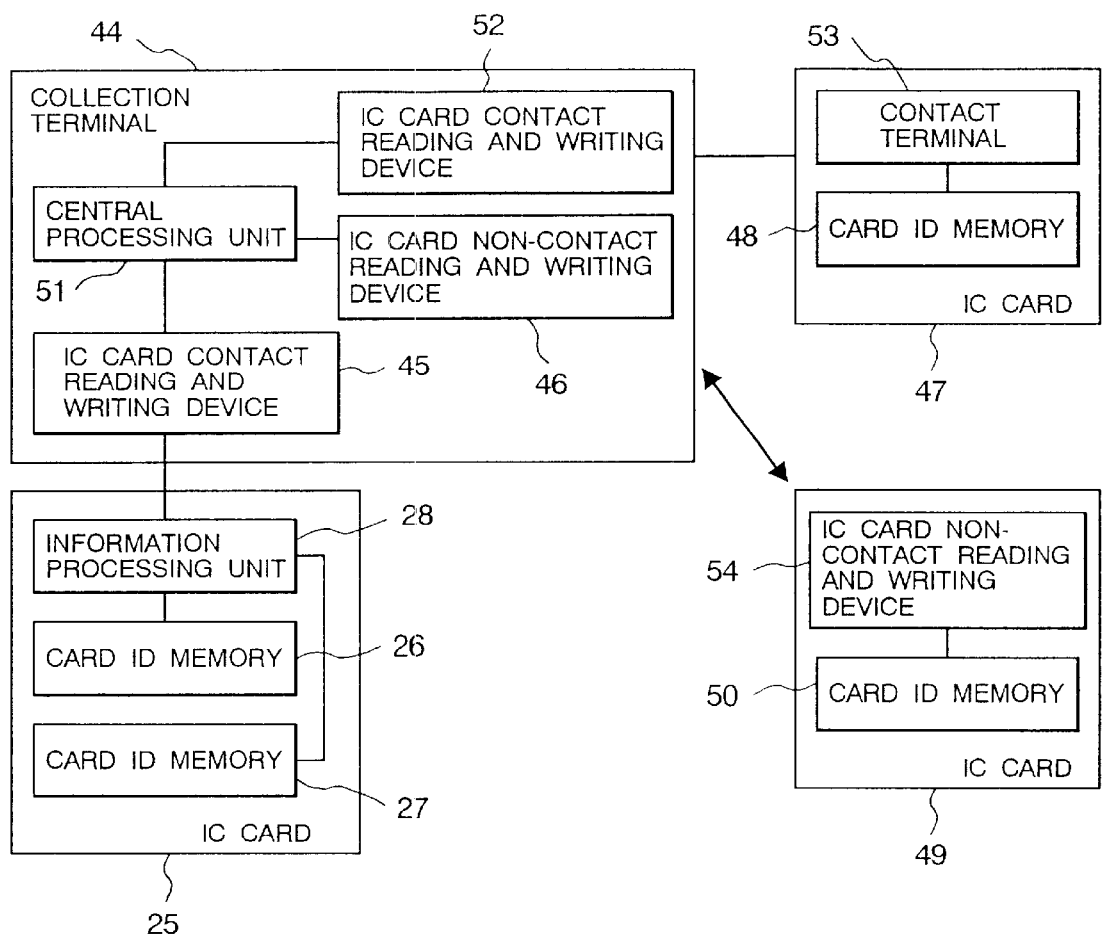
FIG. 13 is a diagram showing a whole construction of the payer terminal part in a fourth embodiment.

FIG. 13 is a construction diagram showing the fourth embodiment of the invention. In FIG. 13, reference numeral 25 denotes an IC card in which the electronic money information is stored; 26 a card ID memory storing a card ID particular to the IC card 25; 27 a card ID memory storing IDs of other IC cards; 28 an information processing unit for controlling the information of the card ID memories 26 and 27 and also controlling the transmission and reception of the electronic money information therein; 44 a terminal for controlling electronic information with the IC card 26; 45 an IC card reader/writer connected to the IC card 25, which transmits and receives the electronic information; 46 an IC card non-contact reader/writer that is provided in the terminal 44 and transmits and receives information in a non-contact manner; 47 an IC card as one of the other IC cards; 48 a card ID memory having a particular ID in the IC card 47; 49 another IC card; and 50 a card ID memory having a particular ID in the IC card 49.

Figure 14:
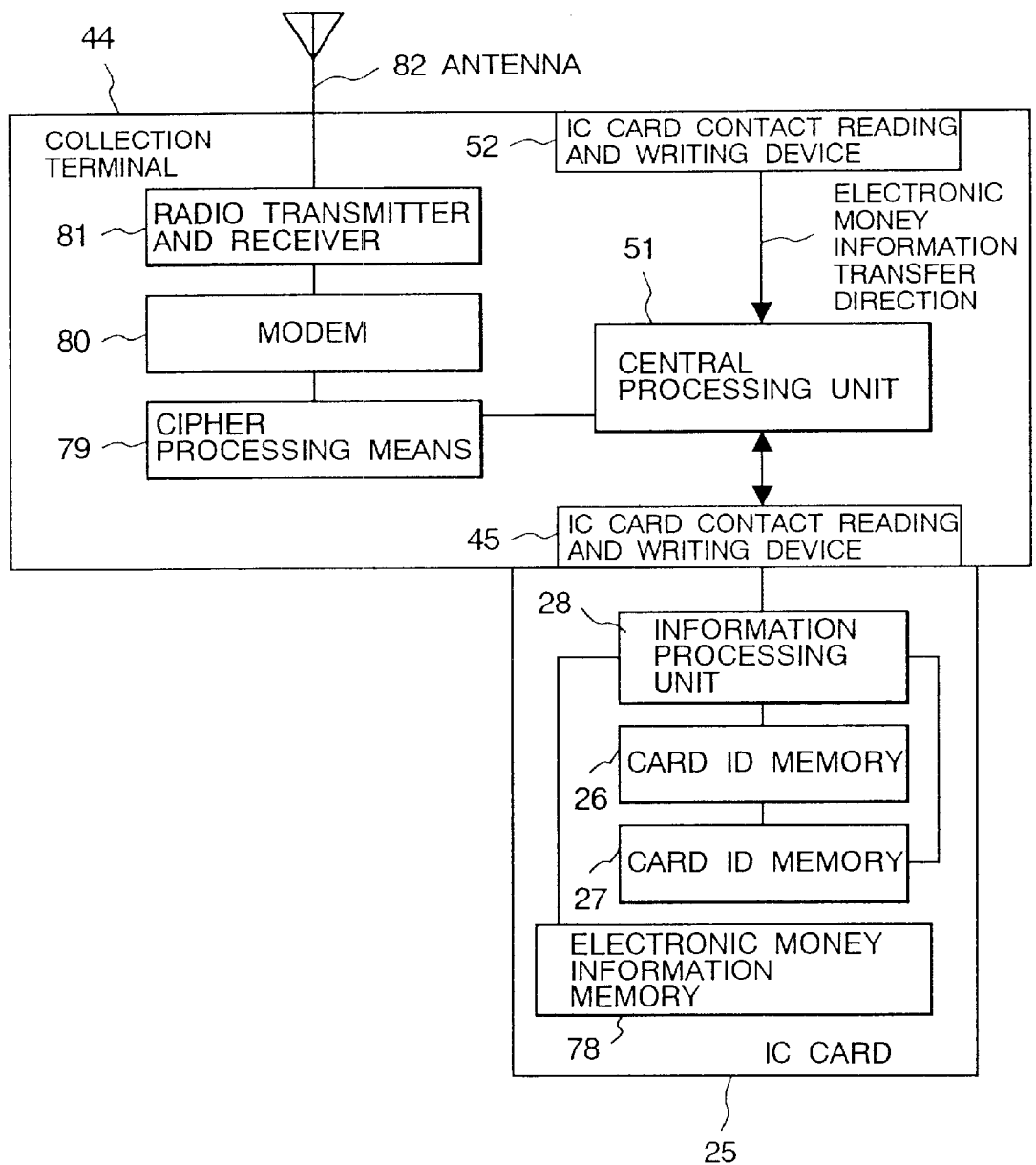
FIG. 14 is a diagram showing a part of the construction of the payer terminal part in the fourth embodiment.

FIG. 14 is a diagram showing the constructions of the IC card 25 and the terminal 44 in FIG. 13. As an IC card non-contact reader and writer, a code processing unit 79, a modem 80, a radio transmitter and receiver 81, and an antenna 82 are provided. The code processing unit 79 encodes electronic information from the CPU 51 and decodes the encoded electronic information from the modem 80 to the original electronic information. In the modem, the electronic information is changed to a form of a signal which can be transmitted and received to/from the outside via the radio transmitter and receiver 81. It is obviously understood that the IC card 25 has therein an electronic money information store 78 for storing the electronic money information.

Figure 15:
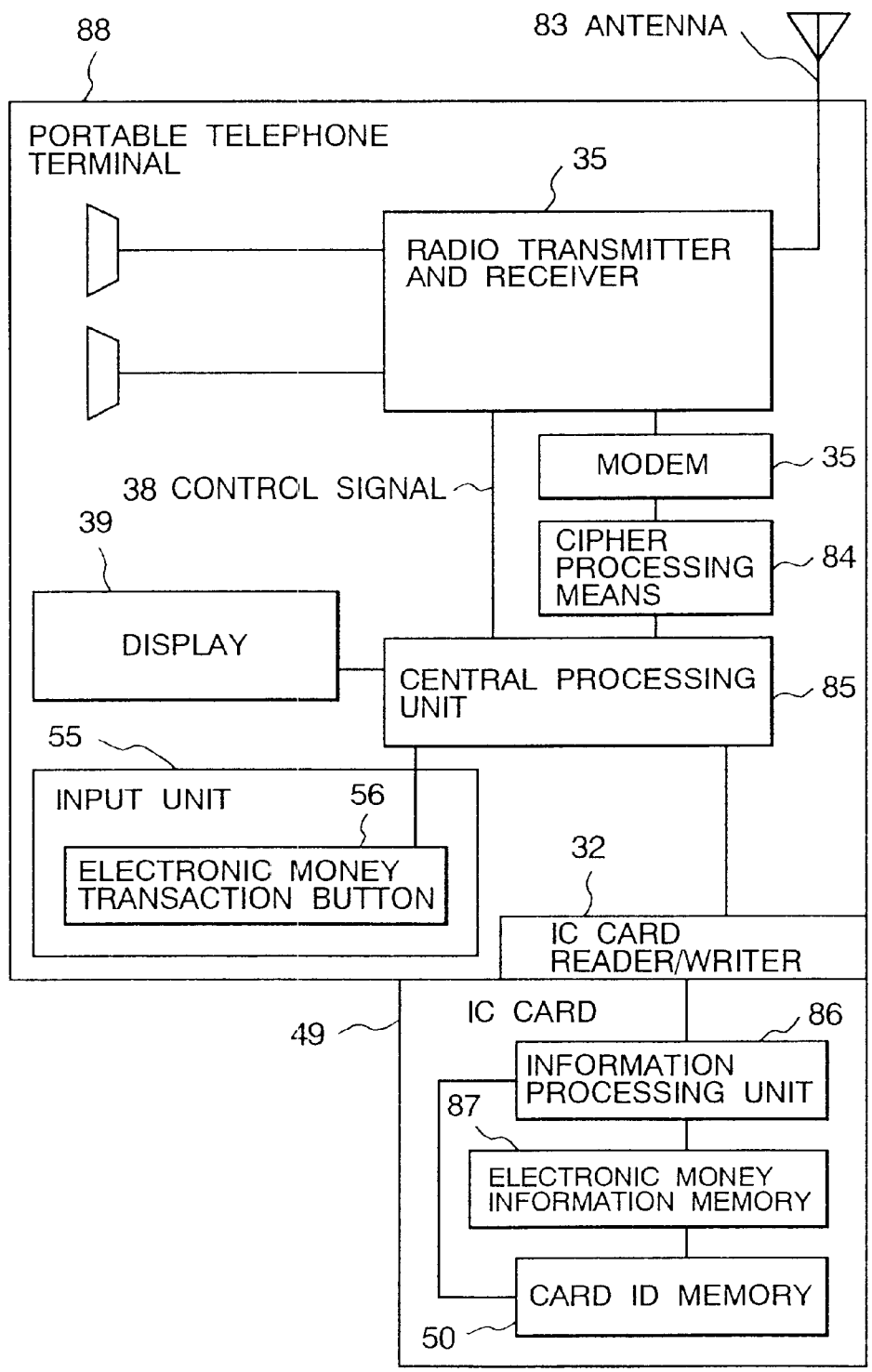
FIG. 15 is a diagram showing a part of the construction of the payer terminal part in the fourth embodiment.

FIG. 15 is a diagram showing the construction of a portable telephone terminal 88 connected to the IC card 49 shown in FIG. 13. Components similar to those in the first embodiment are designated by the same reference numerals. In addition to the construction of the first embodiment, according to the fourth embodiment, a code processing unit 84 has functions of decoding the encoded electronic information, and encoding electronic information and transmitting the encoded information to the modem 34.

The operation of the fourth embodiment with the above construction will be described. In the embodiment, an ordinary payer who is going to receive service makes payment by using the IC card 47. In the IC card 25, the particular ID of the ID memory 48 in the IC card 47 inserted through the terminal 44 is read out and is checked with the ID of a specified IC card stored in the card ID memory 47 in the IC card 25. When it is found that the particular ID of the card ID memory 48 in the IC card 47 is different from the ID stored in the card ID memory 27 in the IC card 25, the IC card 25 functions only to receive the electronic money information. When an encoded particular ID is sent to the IC card 49 via the IC card non-contact reader and writer 46 in the terminal 44, the terminal 44 decodes the code and sends the transmitted ID to the IC card 25. Similarily, the IC card 25 checks the ID stored in the internal ID memory 27 with the ID recorded in the ID memory 50 in the IC card 49. When the two IDs coincide, the information processing unit 28 permits that the electronic money information in the IC card 25 is transferred to the IC card 49. Consequently, the electronic money information stored in the IC card 25 is sent via the modem 80 and radio transmitter and receiver 81. In the portable telephone terminal 88, the transmitted electronic money information is received and is transferred from the IC card reader 32 via the modem 34 to the IC card 49. The IC card 49 stores the transmitted electronic money information into the electronic money information memory 87.

According to the fourth embodiment, the payer of the electronic money who is to receive the service pays the electronic money by inserting the IC card 47 into the terminal 44 provided in the service supply equipment. Further, the electronic money information stored in the IC card 25 in the terminal 44 can be transferred to the IC card 49 in such a manner that the collector operates the electronic money transaction button 56 of the input unit 55 in the portable telephone terminal 88 having the IC card 49 to transmit and receive radio waves via space. An IC card which can receive the electronic money is the IC card 49 only, whose ID coincides with the stored ID. There is an effect that the person who installed the service supply equipment can collect the electronic money stored in the service supply equipment from a remote place by using the IC card 49 without inserting the IC card into the terminal.

The entire disclosure of Japanese Patent Application No. 8-246498 filed on Sep. 18, 1996 including specification, claims, drawings and summary are incorporated herein by reference in its entirety.

What is claimed is:

1. An electronic money transaction device useable with an IC card storing electronic money information, and a portable telephone which transmits and receives electronic information to/from outside by using electromagnetic waves for performing transactions of the electronic money information in said IC card, said electronic money transaction device comprising:

a transmitter and receiver which transmits a signal indicating a specific service to a service supply equipment, and transmits at least one of an ID information identifying the electronic money transaction device and an ID information identifying the IC card;

an electronic money store which stores at least electronic money information concerning the electronic information transmitted and received via the transmitter and receiver:

said service supply equipment being operated by said signal indicating the specific service, based upon at least one of the received ID information identifying the electronic money transaction device and the received ID information identifying the IC card, including:

a time information generator which starts to generate a time information when said specific service indicated by the signal is started;

a memory which stores the generated time information; and a processing unit which counts the amount of money to be paid for said specific service based on the generated time information;

wherein said ID information is payer discriminating information transmitted by said portable telephone.

2. The device according to claim 1, wherein the electronic money store and the service supply equipment are separately provided.

3. The device according to claim 1, comprising:

a user prompter to prompt an operator of the electronic money transaction device to perform an operation at least once to show desire of receiving the service from the service supply equipment before completion of the transaction of the electronic money.

4. The device according to claim 3, comprising:

a display which prompts the operator to perform the operation to show the desire of receiving the service.

5. The device according to claim 4, wherein after the operator performs the operation to show the desire of receiving the service, the electronic money store receives electronic information indicative of the operation via said portable telephone, and the electronic money store generates a confirmation signal indicative of receipt of the electronic information indicative of the operation.

6. The device according to claim 5, comprising:

a confirmation signal display which displays the confirmation signal showing the receipt of the electronic information indicative of the operation.

7. The device according to claim 6, the confirmation signal display is provided at a position so that the operator to receive the service of the service supply equipment can discriminate the service contents.

8. The device according to claim 3, comprising:

a display provided at a position so that the operator to receive the service of the service supply equipment can discriminate the service contents.

9. The device according to claim 8, wherein the promptor has an input unit of a character string, a number, or a code, wherein said character string, number, or code is displayed on the display, and the operator may input the displayed character string, number, or code from an input means, thereby performing the operation to show the desire of receiving the service.

10. The device according to claim 1, wherein said ID information is unique information stored in said portable telephone.

11. The device according to claim 1, wherein said ID information is an unique number stored in said IC card.

12. An electronic money transaction device useable with a first IC card storing electronic money information, a first transmitter and receiver that is connected to the first IC card and transmits and receives the electronic money information via wireless communications, and a second IC card which records the electronic money information that passed through a connecting unit, comprising:

a second transmitter and receiver for transmitting and receiving the electronic money information via the first transmitter and receiver;

a terminal for controlling transfer of the electronic money information via the second transmitter and receiver;

the connecting unit for passing the electronic money information from the terminal;

wherein the first IC card has a memory for storing electronic information of the first IC card, the electronic information in the first IC card memory is transferred to the terminal via the first transmitter and receiver and the second transmitter and receiver, the terminal has a passing means for transmitting the electronic information of the first IC card which passed the first transmitter and receiver to the second IC card via the second transmitter and receiver and specific electronic information which is recorded in a memory for verification of permissible IC cards is compared with the electronic information sent from the first IC card, and when a verification condition is satisfied in the comparison, the electronic money information is transferred from the second IC card to the first IC card;

wherein the electronic money information is transferred from the first IC card to the second IC card irrespective of the result of the comparison of the electronic information sent from the first IC card with the electronic information recorded in the second IC card.

13. The device according to claim 12, wherein the electronic money information sent from the first IC card is compared with the electronic information recorded in the second IC card by an information processing unit in the second IC card for controlling the second IC card.

14. The device according to claim 13, wherein a portable telephone terminal has particular information, the particular information is sent from the portable telephone terminal, and a service supply equipment manages supply of service on the basis of the particular information.

15. The device according to claim 14, wherein the portable telephone terminal has particular information, the particular information is sent from the portable telephone terminal, the service supply equipment is provided with means for generating time information, the device comprising time storing means for storing the particular information sent and the time information as an output from the time information generating means, and the service supply equipment records the information into the time storing means, thereby managing the service supply.

16. The device according to claim 12, wherein said specific electronic information recorded in said memory is recorded in said second IC card.

17. An electronic money transaction device useable with a first IC card in which electronic money information is stored, a first transmitter and receiver that is connected to the first IC card and transmits and receives the electronic money information via wireless communications, and a second IC card which records the electronic money information passed through a connecting unit, comprising:

a second transmitter and receiver for transmitting and receiving the electronic money information via the first transmitter and receiver:

a terminal for controlling transfer of the electronic money information via the second transmitter and receiver;

the connecting unit for passing the electronic money information from the terminal;

wherein the first IC card has a memory for storing coded electronic information of the first IC card, the coded electronic information in the first IC card memory is transferred to the terminal via the first transmitter and receiver and the second transmitter and receiver, the terminal has a decoding and passing means for decoding the coded electronic information of the first IC card that passed through the transmitter and receiver and transmitting decoded electronic information of the first IC card to the second IC card via the second transmitter and receiver, specific electronic information which is recorded in a memory for verification of permissible IC cards is compared with the electronic information sent from the first IC card, and when a verification condition is satisfied in the comparison, the electronic money information is transferred from the second IC card to the first IC card;

wherein the electronic money information is transferred from the first IC card to the second IC card irrespective of the result of the comparison of the electronic information sent from the first IC card with the electronic information recorded in the second IC card.

18. The device according to claim 17, comprising:

means for specifying a location of a first communicating means; and said service supply equipment further having means for storing the specified location of said first communicating means in said storage means, thereby managing the service supply with said specified location.

19. The device according to claim 17, wherein said specific electronic information recorded in said memory is recorded in said second IC card.

20. An electronic money transaction device useable with an IC card storing electronic money information, and a portable telephone which transmits and receives electronic information to/from outside by using electromagnetic waves for performing transactions of the electronic money information in said IC card, said electronic money transaction device comprising:

a transmitter and receiver which transmits a signal indicating a specific service to a service supply equipment, and transmits at least one of an ID information identifying the electronic money transaction device and an ID information identifying the IC card;

an electronic money store which stores at least electronic money concerned in the electronic information transmitted and received via said transmitter and receiver;

said service supply equipment having a gate operated by said signal indicating the specific service, and is operated based upon at least one of the received ID information identifying the electronic money transaction device and the received ID information identifying the IC card, said service supply equipment comprising:

a time information generator which starts to generate time information when said specific service indicated by said signal is started;

a memory which stores said the generated time information; and a processing unit which counts the amount of money to be paid for said specific service based on the generated time information, and operates said gate based upon said signal indicating said specific service and at least said one of an ID information identifying said electronic money transaction device and said ID information identifying said IC card;

wherein said ID information is a payer discriminating information transmitted by said portable telephone.

21. The device according to claim 20, wherein said ID information is unique information stored in said portable telephone.

22. The device according to claim 20, wherein said ID information is an unique number stored in said IC card.

* * * * *